US012666155B2

(12) United States Patent
Wang et al.

(10) Patent No.: US 12,666,155 B2
(45) Date of Patent: Jun. 23, 2026

(54) SYSTEMS AND METHODS FOR VIDEO SURVEILLANCE

(71) Applicant: ZHEJIANG DAHUA TECHNOLOGY CO., LTD., Hangzhou (CN)

(72) Inventors: Jianmiao Wang, Hangzhou (CN); Feiyue Zhu, Hangzhou (CN); Liang Sun, Hangzhou (CN); Jintao Chen, Hangzhou (CN); Yuan Chen, Hangzhou (CN); Wentao Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 74 days.

(21) Appl. No.: 18/488,970

(22) Filed: Oct. 17, 2023

(65) Prior Publication Data

US 2024/0048855 A1 Feb. 8, 2024

Related U.S. Application Data

(63) Continuation of application No. PCT/CN2021/112146, filed on Aug. 11, 2021.

(30) Foreign Application Priority Data

Apr. 23, 2021 (CN) .......................... 202110444443.X

(51) Int. Cl.
*H04N 23/74* (2023.01)
*H04N 7/18* (2006.01)
(Continued)

(52) U.S. Cl.
CPC .............. *H04N 23/74* (2023.01); *H04N 7/18* (2013.01); *H04N 23/73* (2023.01); *H04N 23/745* (2023.01)

(58) Field of Classification Search
CPC ..................................................... H04N 23/74
See application file for complete search history.

(56) References Cited

U.S. PATENT DOCUMENTS 10,404,922 B2 9/2019 Hong et al.
2009/0160937 A1 6/2009 Son
(Continued)

FOREIGN PATENT DOCUMENTS

CN 1740892 A 3/2006
CN 101326814 A 12/2008
(Continued)

OTHER PUBLICATIONS

Espacenet, partial Machine Translation of CN112672009 A with paragraph numbering (Year: 2005).*
(Continued)

*Primary Examiner* — David N Werner
(74) *Attorney, Agent, or Firm* — METIS IP LLC

(57) ABSTRACT

The present disclosure relates to systems and methods for video surveillance. The systems may obtain an initial time period corresponding to at least part of a time period during which at least one target image frame is captured by the monitoring equipment based on at least one parameter of a monitoring equipment. The systems may obtain a warning scheme associated with the initial time period. The warning scheme may include controlling an operation of a light associated with the monitoring equipment within at least one candidate time period in the initial time period and processing the at least one target image frame.

15 Claims, 11 Drawing Sheets

(51) Int. Cl.
    *H04N 23/73*      (2023.01)
    *H04N 23/745*     (2023.01)

(56)            References Cited

U.S. PATENT DOCUMENTS

| | | | | |
|---|---|---|---|---|
| 2010/0321676 A1 * | 12/2010 | Sasaki | E05F 15/74 |
| | | | 356/221 |
| 2011/0043682 A1 | 2/2011 | Chou et al. | |
| 2011/0292241 A1 | 12/2011 | Segapelli et al. | |
| 2011/0298947 A1 | 12/2011 | Guo et al. | |
| 2013/0208149 A1 | 8/2013 | Kamiya | |
| 2014/0300817 A1 | 10/2014 | Bezman et al. | |
| 2015/0207975 A1 | 7/2015 | Nguyen et al. | |
| 2016/0100088 A1 | 4/2016 | Sekiguchi et al. | |
| 2017/0323165 A1 * | 11/2017 | Haebig | G06F 3/017 |
| 2018/0101154 A1 | 4/2018 | Nomoto et al. | |
| 2018/0213141 A1 | 7/2018 | Pandit et al. | |
| 2018/0234646 A1 | 8/2018 | Kobayashi | |
| 2019/0246477 A1 | 8/2019 | Sinitsyn et al. | |
| 2019/0287367 A1 * | 9/2019 | Birnkrant | G08B 17/06 |
| 2023/0347502 A1 * | 11/2023 | Wang | G06T 7/70 |

FOREIGN PATENT DOCUMENTS

| | | | | | |
|---|---|---|---|---|---|
| CN | 103384308 A | | 11/2013 | | |
| CN | 203377959 U | | 1/2014 | | |
| CN | 105120133 A | | 12/2015 | | |
| CN | 106303257 A | | 1/2017 | | |
| CN | 106971553 A | * | 7/2017 | | H04N 23/70 |
| CN | 106973241 A | * | 7/2017 | | H05B 47/105 |
| CN | 107026985 A | | 8/2017 | | |
| CN | 206907049 U | * | 1/2018 | | |
| CN | 107818283 A | * | 3/2018 | | H04N 23/70 |
| CN | 108156427 A | | 6/2018 | | |
| CN | 108447208 A | | 8/2018 | | |
| CN | 108470450 A | * | 8/2018 | | H05B 47/105 |
| CN | 108566517 A | * | 9/2018 | | G08G 1/0175 |
| CN | 110099221 A | * | 8/2019 | | H04N 23/74 |
| CN | 110445952 A | | 11/2019 | | |
| CN | 110830729 A | * | 2/2020 | | H04N 23/73 |
| CN | 111064901 A | * | 4/2020 | | H04N 23/74 |
| CN | 210518559 U | | 5/2020 | | |
| CN | 111355864 A | | 6/2020 | | |
| CN | 111653101 A | * | 9/2020 | | H04N 23/56 |
| CN | 111654639 A | * | 9/2020 | | H04N 23/56 |
| CN | 111741226 A | | 10/2020 | | |
| CN | 111818271 A | | 10/2020 | | |
| CN | 111818272 A | | 10/2020 | | |
| CN | 112019817 | | 12/2020 | | |
| CN | 112351184 A | | 2/2021 | | |
| CN | 112672009 A | | 4/2021 | | |
| EP | 2512122 A1 | | 10/2012 | | |
| JP | H0693606 A | * | 4/1994 | | |
| JP | 2006295591 A | | 10/2006 | | |
| JP | 2010278614 A | | 12/2010 | | |
| JP | 2011029759 | | 2/2011 | | |
| JP | 2017143404 A | | 8/2017 | | |
| JP | 6399572 B1 | * | 10/2018 | | |
| KR | 101558255 B1 | | 10/2015 | | |
| WO | 2010108186 A1 | | 9/2010 | | |
| WO | WO-2022062802 A1 | * | 3/2022 | | H04N 23/74 |

OTHER PUBLICATIONS

The Extended European Search Report in European Application No. 20943084.2 mailed on Sep. 18, 2023, 8 pages.

International Search Report in PCT/CN2020/137575 mailed on Mar. 25, 2021, 4 pages.

Written Opinion in PCT/CN2020/137575 mailed on Mar. 25, 2021, 5 pages.

International Search Report in PCT/CN2021/112146 mailed on Jan. 19, 2022, 5 pages.

Written Opinion in PCT/CN2021/112146 mailed on Jan. 19, 2022, 5 pages.

First Office Action in Chinese Application No. 202110444443.X mailed on Feb. 28, 2022, 14 pages.

1 The Extended European Search Report in European Application No. 21937543.3 mailed on Jul. 23, 2024, 9 pages.

First Office Action in Chinese Application No. 202010623002.1 mailed on Mar. 29, 2021, 20 pages.

* cited by examiner

<u>100</u>

130

130-1    130-2              130-3

150

112    110

120

Network

Storage
Device

Obtaining an initial time period corresponding to at least part of a time period during which at least one target image frame is sequentially captured by the monitoring equipment based on at least one parameter of a monitoring equipment ⟋ 510

Obtaining a warning scheme associated with the initial time period ⟋ 520

<u>1000</u>

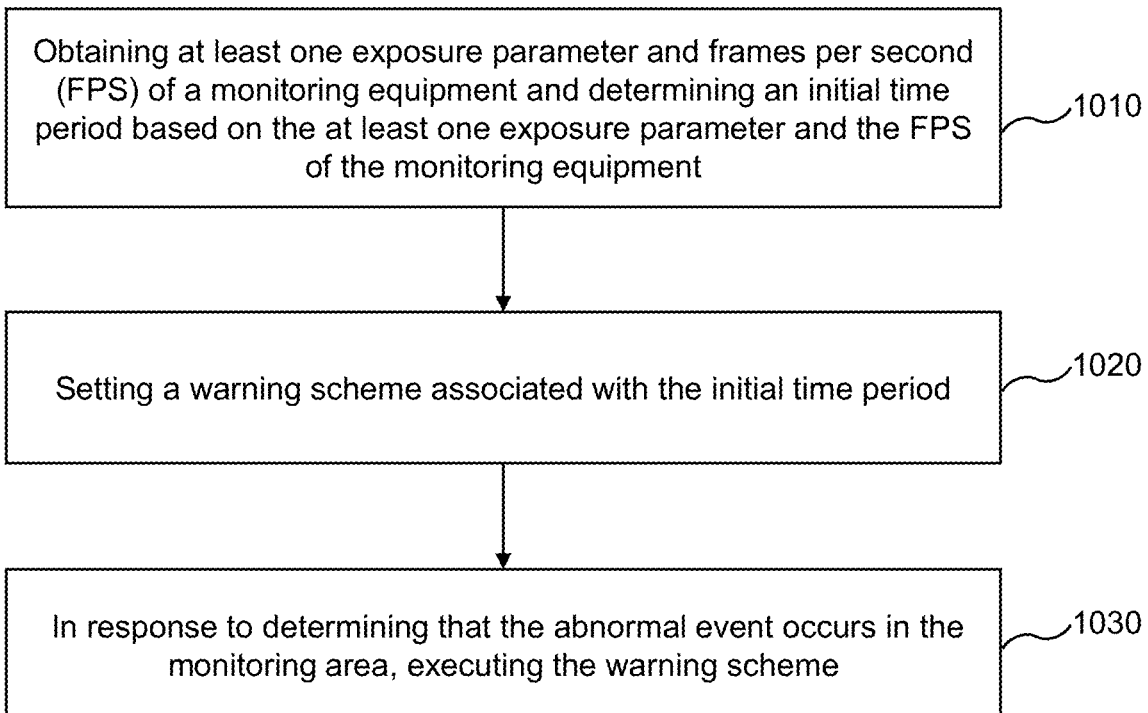

Obtaining at least one exposure parameter and frames per second (FPS) of a monitoring equipment and determining an initial time period based on the at least one exposure parameter and the FPS of the monitoring equipment — 1010

Setting a warning scheme associated with the initial time period — 1020

In response to determining that the abnormal event occurs in the monitoring area, executing the warning scheme — 1030

FIG. 10

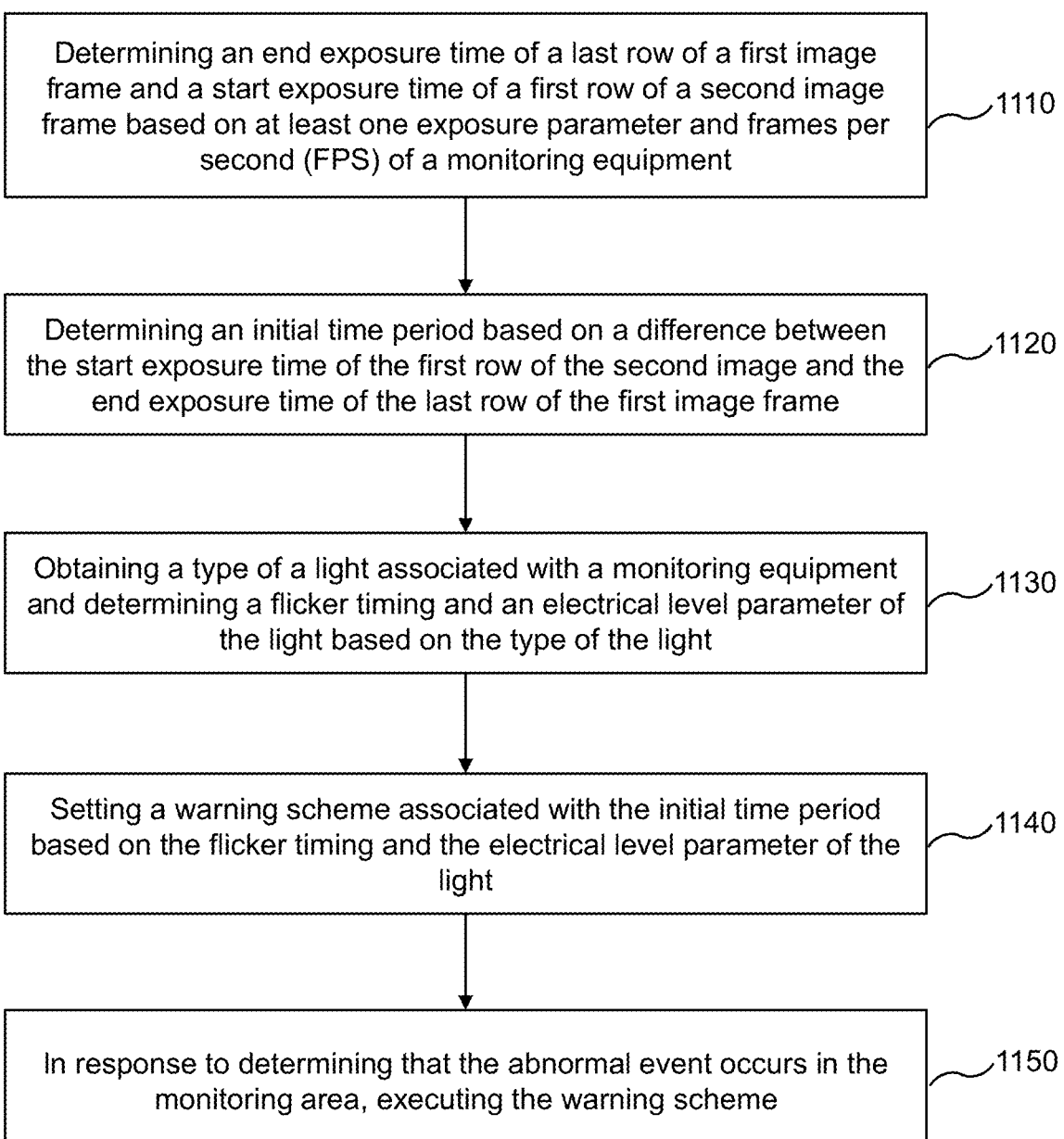

1100

Determining an end exposure time of a last row of a first image frame and a start exposure time of a first row of a second image frame based on at least one exposure parameter and frames per second (FPS) of a monitoring equipment ⟋1110

Determining an initial time period based on a difference between the start exposure time of the first row of the second image and the end exposure time of the last row of the first image frame ⟋1120

Obtaining a type of a light associated with a monitoring equipment and determining a flicker timing and an electrical level parameter of the light based on the type of the light ⟋1130

Setting a warning scheme associated with the initial time period based on the flicker timing and the electrical level parameter of the light ⟋1140

In response to determining that the abnormal event occurs in the monitoring area, executing the warning scheme ⟋1150

FIG. 11

SYSTEMS AND METHODS FOR VIDEO SURVEILLANCE

CROSS-REFERENCE TO RELATED APPLICATIONS

This application is a Continuation of International Application No. PCT/CN2021/112146 filed on Aug. 11, 2021, which claims priority to Chinese Patent Application No. 202110444443.X filed on Apr. 23, 2021, the contents of each of which are incorporated herein by reference in their entirety.

TECHNICAL FIELD

The present disclosure generally relates to monitoring technology, and in particular, to systems and methods for video surveillance.

BACKGROUND

With the development of communication and multimedia technologies, the exploration of monitoring technology and monitoring equipment has developed rapidly nowadays. Commonly, when detecting an abnormality, a monitoring equipment (e.g., a security camera) may provide a warning by causing a light associated with the monitoring equipment to flicker. However, the flicker of the light may cause a brightness change (e.g., change between light and dark) of monitoring environment of the monitoring equipment, which may affect the monitoring effect (e.g., a monitoring picture) of the monitoring equipment. Therefore, it is desirable to provide systems and methods for video surveillance, thereby reducing or eliminating the impact of the flicker of the light on the monitoring effect of the monitoring equipment.

SUMMARY

An aspect of the present disclosure relates to a system for video surveillance. The system may include at least one storage medium including a set of instructions and at least one processor in communication with the at least one storage medium. When executing the set of instructions, the at least one processor may be directed to cause the system to implement operations. The operations may include obtaining an initial time period corresponding to at least part of a time period during which at least one target image frame is captured by the monitoring equipment based on at least one parameter of a monitoring equipment. The operations may further include obtaining a warning scheme associated with the initial time period. The warning scheme may include controlling an operation of a light associated with the monitoring equipment within at least one candidate time period in the initial time period and processing the at least one target image frame.

In some embodiments, the at least one parameter of the monitoring equipment may include frames per second (FPS), a count of rows that are sequentially exposed by a shutter of the monitoring equipment, an exposure interval between two adjacent rows, a shutter time, and/or a buffer time between two adjacent frames.

In some embodiments, the obtaining the initial time period corresponding to the at least part of the time period during which the at least one target image frame is sequentially captured by the monitoring equipment based on the at least one parameter of the monitoring equipment may include obtaining a first image frame and a second image frame associated with the at least one target image frame and determining the initial time period based on the first image frame and the second image frame. The first image frame, the at least one target image frame, and the second image frame may be sequentially captured by the monitoring equipment In some embodiments, the determining the initial time period based on the first image frame and the second image frame may include obtaining an end exposure time of a last row among a plurality of rows of the first image frame that are sequentially exposed by a shutter of the monitoring equipment; obtaining a start exposure time of a first row among a plurality of rows of the second image frame that are sequentially exposed by the shutter of the monitoring equipment; and determining the initial time period based on the end exposure time of the last row of the first image frame and the start exposure time of the first row of the second image frame.

In some embodiments, the controlling the operation of the light associated with the monitoring equipment within at least one candidate time period in the initial time period may include controlling the light to flicker within the at least one candidate time period based on a parameter of the light.

In some embodiments, the controlling the light to flicker within the at least one candidate time period based on the parameter of the light may include obtaining a distance between the monitoring equipment and a monitoring area of the monitoring equipment where an abnormal event occurs and controlling at least one of a flicker frequency or a brightness of the light based on the parameter of the light and the distance.

In some embodiments, the processing the at least one target image frame may include discarding the at least one target image frame from a plurality of image frames that have been captured by the monitoring equipment; or replacing the at least one target image frame with one or more image frames among the plurality of image frames.

In some embodiments, the replacing the at least one target image frame with one or more image frames among the plurality of image frames may include replacing the at least one target image frame with at least one of a first image frame or a second image frame.

In some embodiments, the operations may further include obtaining one or more image frames associated with a monitoring area captured by the monitoring equipment. The at least one target image frame may be determined based on the one or more image frames. The operations may further include determining whether an abnormal event occurs in the monitoring area based on the one or more image frames and executing, in response to determining that the abnormal event occurs in the monitoring area, the warning scheme.

In some embodiments, the abnormal event may include an object appearing in the monitoring area, a fire breaking out, an object displacement, a conflict, and/or an accident.

In some embodiments, the operations may further include determining whether the abnormal event disappears in the monitoring area based on the one or more image frames and stopping, in response to determining that the abnormal event disappears in the monitoring area, execution of the warning scheme.

A further aspect of the present disclosure relates to a method for video surveillance. The method may be implemented on a computing device including at least one processor, at least one storage medium, and a communication platform connected to a network. The method may include obtaining an initial time period corresponding to at least part of a time period during which at least one target image frame is captured by the monitoring equipment based on at least one parameter of a monitoring equipment. The method may further include obtaining a warning scheme associated with the initial time period. The warning scheme may include controlling an operation of a light associated with the monitoring equipment within at least one candidate time period in the initial time period and processing the at least one target image frame.

A still further aspect of the present disclosure relates to a system for video surveillance. The system may include a first obtaining module and a second obtaining module. The first obtaining module may be configured to obtain an initial time period corresponding to at least part of a time period during which at least one target image frame is captured by the monitoring equipment based on at least one parameter of a monitoring equipment. The second obtaining module may be configured to obtain a warning scheme associated with the initial time period. The warning scheme may include controlling an operation of a light associated with the monitoring equipment within at least one candidate time period in the initial time period and processing the at least one target image frame.

A still further aspect of the present disclosure relates to a non-transitory computer readable medium including executable instructions. When the executable instructions are executed by at least one processor, the executable instructions may direct the at least one processor to perform a method. The method may include obtaining an initial time period corresponding to at least part of a time period during which at least one target image frame is captured by the monitoring equipment based on at least one parameter of a monitoring equipment. The method may further include obtaining a warning scheme associated with the initial time period. The warning scheme may include controlling an operation of a light associated with the monitoring equipment within at least one candidate time period in the initial time period and processing the at least one target image frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a schematic diagram illustrating an exemplary video surveillance system according to some embodiments of the present disclosure;

FIG. 10 is a flowchart illustrating an exemplary process for video surveillance according to some embodiments of the present disclosure; and FIG. 11 is a flowchart illustrating an exemplary process for video surveillance according to some embodiments of the present disclosure;

DETAILED DESCRIPTION

Figure 2:
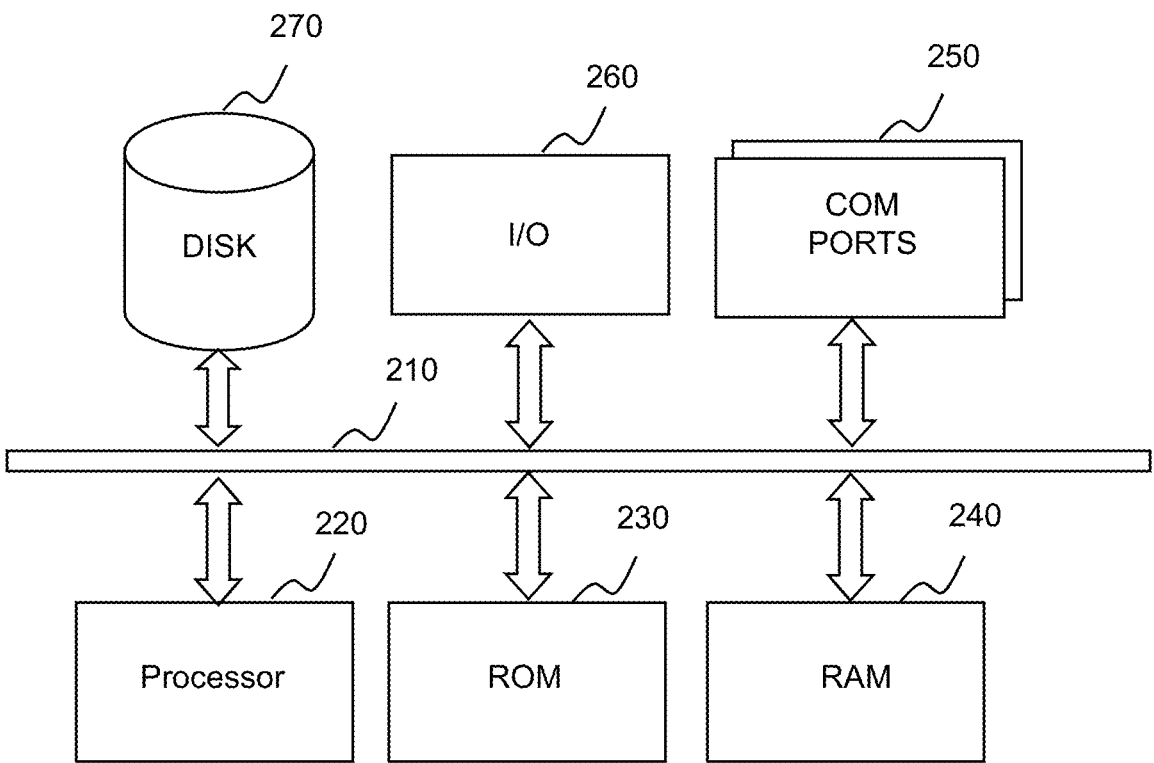
FIG. 2 is a schematic diagram illustrating exemplary hardware and/or software components of an exemplary computing device according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for video surveillance. The systems may obtain an initial time period corresponding to at least part of a time period during which at least one target image frame is captured by a monitoring equipment based on at least one parameter of the monitoring equipment. The systems may obtain a warning scheme associated with the initial time period. The warning scheme may include controlling an operation of a light associated with the monitoring equipment within at least one candidate time period in the initial time period. For example, the light may be controlled to flicker within the at least one candidate time period. The warning scheme may further include processing the at least one target image frame. For example, the at least one target image frame may be discarded (removed or deleted) from a plurality of image frames that have been captured by the monitoring equipment. As another example, the at least one target image frame may be replaced with one or more image frames among the plurality of image frames.

According to the systems and methods of the present disclosure, the operation (e.g., flicker) of the light may be controlled within the at least one candidate time period in the initial time period to provide a warning. The at least one target image frame (e.g., a brightness) may be affected by the operation (e.g., flicker) of the light. Further, the at least one target image frame may be processed to discard or replace the at least one target image frame, so that a monitoring picture of the monitoring equipment would not be affected by the operation (e.g., flicker) of the light, thereby realizing both the warning function and the supplementary light function.

FIG. 1 is a schematic diagram illustrating an exemplary video surveillance system according to some embodiments of the present disclosure. In some embodiments, the video surveillance system 100 may be applied in various application scenarios, for example, object monitoring, fire monitoring, etc. As shown, the video surveillance system 100 may include a server 110, a network 120, a monitoring equipment 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the monitoring equipment 130, the user device 140, and/or the storage device 150 via the network 120. As another example, the server 110 may be directly connected to the monitoring equipment 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to video surveillance to perform one or more functions described in the present disclosure. For example, the processing device 112 may obtain an initial time period corresponding to at least part of a time period during which at least one target image frame is sequentially captured by the monitoring equipment 130 based on at least one parameter of the monitoring equipment 130. Further, the processing device 112 may obtain a warning scheme associated with the initial time period. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a micro-controller unit, a reduced instruction set computer (RISC), a microprocessor, or the like, or any combination thereof.

In some embodiment, the server 110 may be unnecessary and all or part of the functions of the server 110 may be implemented by other components (e.g., the monitoring equipment 130, the user device 140) of the video surveil-lance system 100. For example, the processing device 112 may be integrated into the monitoring equipment 130 or the user device 140 and the functions (e.g., obtaining an initial time period corresponding to at least part of a time period during which at least one target image frame is sequentially captured by the monitoring equipment 130) of the process-ing device 112 may be implemented by the monitoring equipment 130 or the user device 140.

The network 120 may facilitate exchange of information and/or data for the video surveillance system 100. In some embodiments, one or more components (e.g., the server 110, the monitoring equipment 130, the user device 140, the storage device 150) of the video surveillance system 100 may transmit information and/or data to other component(s) of the video surveillance system 100 via the network 120. For example, the server 110 and/or the user device 140 may obtain the at least one parameter of the monitoring equip-ment 130 and/or a plurality of image frames that have been captured by the monitoring equipment 130 from the moni-toring equipment 130 via the network 120. As another example, the server 110 may transmit a plurality of pro-cessed image frames in which the at least one target image frame has been processed and/or the abnormal event that occurs in a monitoring area of the monitoring equipment 130 to the user device 140 via the network 120. In some embodiments, the network 120 may be any type of wired or wireless network, or a combination thereof.

The monitoring equipment 130 may be configured to acquire image frames (the "image frame" herein refers to a frame of a monitoring video captured by the monitoring equipment 130). In some embodiments, the monitoring equipment 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD) image sensor, a Comple-mentary Metal Oxide Semiconductor (CMOS) image sen-sor, or the like, or any combination thereof. In some embodi-ments, the monitoring equipment 130 may include a plurality of components each of which can acquire image frames. For example, the monitoring equipment 130 may include a plurality of sub-cameras that can capture image frames or monitoring videos simultaneously. In some embodiments, the monitoring equipment 130 may transmit the acquired image frames to one or more components (e.g., the server 110, the user device 140, the storage device 150) of the video surveillance system 100 via the network 120.

In some embodiments, the monitoring equipment 130 may include or may be associated with a light (not shown). In some embodiments, when it is determined that an abnor-mal event occurs in a monitoring area of the monitoring equipment 130, the light may be controlled to flicker within at least one candidate time period in the initial time period (which may be determined based on at least one parameter of the monitoring equipment 130). In some embodiments, the light may include a monochrome light (a white light, a grapefruit red light), a two-color light (e.g., a red and blue light), a three-color light, a multi-color light, etc.

The user device 140 may be configured to receive infor-mation and/or data from the server 110, the monitoring equipment 130, and/or the storage device 150, via the network 120. For example, the user device 140 may receive the at least one parameter of the monitoring equipment 130 and/or the plurality of image frames that have been captured by the monitoring equipment 130 from the monitoring equipment 130 via the network 120. As another example, the user device 140 may receive the plurality of processed image frames in which the at least one target image frame has been processed from the server 110 via the network 120. As a further example, the user device 140 may receive the abnormal event that occurs in the monitoring area of the monitoring equipment 130 from the server 110 via the network 120. In some embodiments, the user device 140 may process information and/or data received from the server 110, the monitoring equipment 130, and/or the stor-age device 150, via the network 120. In some embodiments, the user device 140 may provide a user interface via which a user may view information and/or input data and/or instructions to the video surveillance system 100. For example, the user may view the plurality of image frames that have been captured by the monitoring equipment 130, the plurality of processed image frames in which the at least one target image frame has been processed, and/or the abnormal event that occurs in the monitoring area of the monitoring equipment 130 via the user interface. As another example, the user may input an instruction associated with the video surveillance via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combi-nation thereof. The display of the user device 140 may include a cathode ray tube (CRT) display, a liquid crystal display (LCD), a light-emitting diode (LED) display, a plasma display panel (PDP), a three-dimensional (3D) dis-play, or the like, or a combination thereof.

The storage device 150 may be configured to store data and/or instructions. The data and/or instructions may be obtained from, for example, the server 110, the monitoring equipment 130, and/or any other component of the video surveillance system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. In some embodiments, the storage device 150 may be implemented on a cloud platform. Merely by way of example, the cloud platform may include a private cloud, a public cloud, a hybrid cloud, a community cloud, a distrib-uted cloud, an inter-cloud, a multi-cloud, or the like, or any combination thereof.

In some embodiments, the storage device 150 may be connected to the network 120 to communicate with one or more components (e.g., the server 110, the monitoring equipment 130, the user device 140) of the video surveil-lance system 100. One or more components of the video surveillance system 100 may access the data or instructions stored in the storage device 150 via the network 120. In some embodiments, the storage device 150 may be directly connected to or communicate with one or more components (e.g., the server 110, the monitoring equipment 130, the user device 140) of the video surveillance system 100. In some embodiments, the storage device 150 may be part of other components of the video surveillance system 100, such as the server 110, the monitoring equipment 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the video surveillance system 100 as described herein. For example, the processing device 112 may be implemented on the computing device 200, via its hardware, software program, firmware, or a combination thereof. Although only one such computer is shown, for convenience, the computer functions relating to video surveillance as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
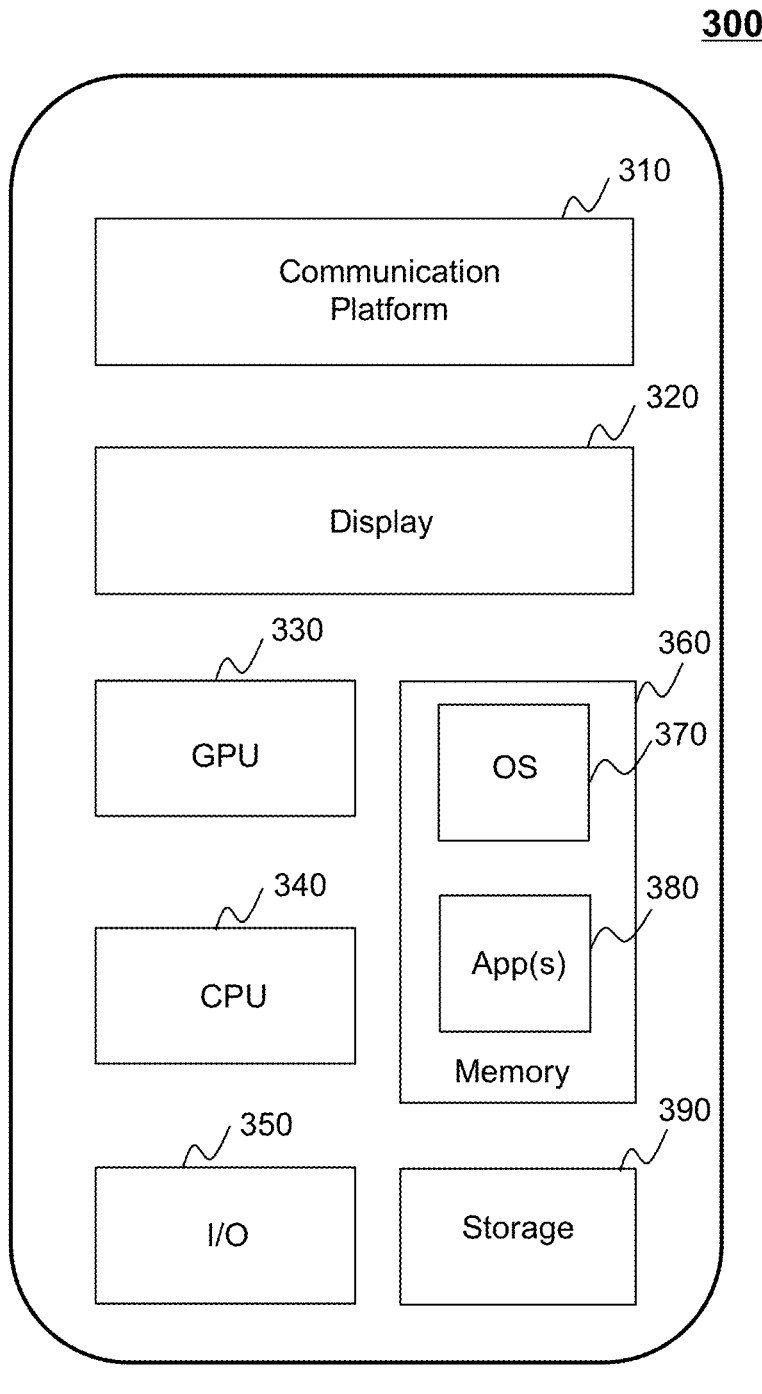
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™' Windows Phone™) and one or more applications (Apps) 380 may be loaded into the memory 360 from the storage 390 in order to be executed by the CPU 340. The applications 380 may include a browser or any other suitable mobile apps for receiving and rendering information relating to video surveillance or other information from the processing device 112. User interactions may be achieved via the I/O 350 and provided to the processing device 112 and/or other components of the video surveillance system 100 via the network 120.

Figure 4:
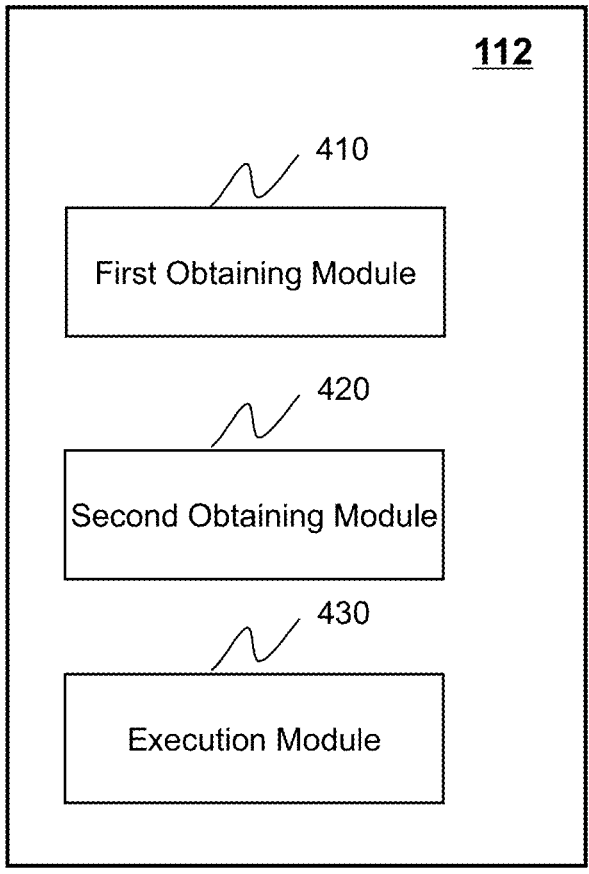
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include a first obtaining module 410, a second obtaining module 420, and an execution module 430.

The first obtaining module 410 may be configured to obtain an initial time period corresponding to at least part of a time period during which at least one target image frame is captured by the monitoring equipment (e.g., the monitoring equipment 130) based on at least one parameter of the monitoring equipment. More descriptions regarding the obtaining of the initial time period may be found elsewhere in the present disclosure, for example, operation 510 in FIG. 5 and relevant descriptions thereof.

The second obtaining module 420 may be configured to obtain a warning scheme associated with the initial time period. More descriptions regarding the obtaining of the warning scheme may be found elsewhere in the present disclosure, for example, operation 520 in FIG. 5 and relevant descriptions thereof.

The execution module 430 may be configured to obtain one or more image frames associated with a monitoring area captured by the monitoring equipment and determine whether an abnormal event occurs in the monitoring area based on the one or more image frames. In response to determining that the abnormal event occurs in the image frame, the execution module 430 may execute the warning scheme. For example, the execution module 430 may control an operation of the light associated with the monitoring equipment within at least one candidate time period in the initial time period. Further, the execution module 430 may process the at least one target image frame corresponding to the initial time period. The execution module 430 may determine whether the abnormal event disappears in the monitoring area based on the one or more image frames. In response to determining that the abnormal event disappears in the monitoring area, the execution module 430 may stop the execution of the warning scheme. Further, the execution module 430 may continue to detect whether a next abnormal event occurs in the monitoring area.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units. For example, the first obtaining module 410 and the second obtaining module 420 may be combined as a single module which may both obtain the initial time period and the warning scheme. In some embodiments, the processing device 112 may include one or more additional modules. For example, the processing device 112 may also include a transmission module (not shown) configured to transmit signals (e.g., electrical signals, electromagnetic signals) to one or more components (e.g., the monitoring equipment 130, the user device 140) of the video surveillance system 100. As another example, the processing device 112 may include a storage module (not shown) used to store information and/or data (e.g., the plurality of image frames that have been captured by the monitoring equipment, at least one parameter of the monitoring equipment, the initial time period, the warning scheme, the plurality of processed image frames in which the at least one target image frame has been processed, etc.) associated with the video surveillance.

Figure 5:
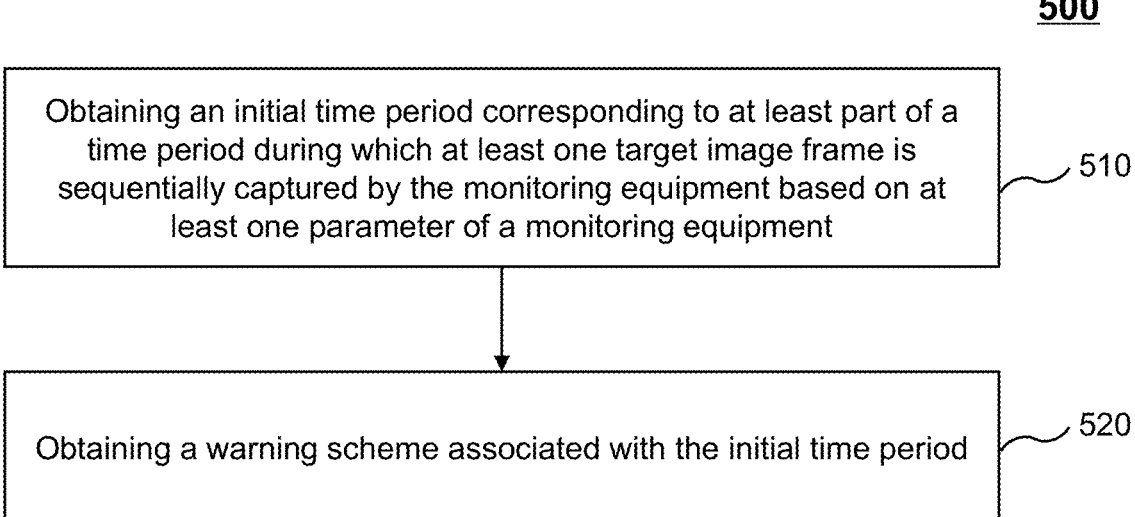
FIG. 5 is a flowchart illustrating an exemplary process for video surveillance according to some embodiments of the present disclosure.

FIG. 5 is a flowchart illustrating an exemplary process for video surveillance according to some embodiments of the present disclosure. In some embodiments, process 500 may be executed by the video surveillance system 100. For example, the process 500 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 112 (e.g., the first obtaining module 410 illustrated in FIG. 4) (e.g., the interface circuits or processing circuits of the processor 220) may obtain an initial time period corresponding to at least part of a time period during which at least one target image frame is captured by the monitoring equipment (e.g., the monitoring equipment 130) based on at least one parameter of the monitoring equipment.

In some embodiments, the monitoring equipment may be used to monitor a monitoring area in real-time and continuously capture a plurality of image frames associated with the monitoring area in sequence to generate a monitoring video. In some embodiments, the processing device 112 may direct the monitoring equipment to sequentially capture the plurality of image frames associated with the monitoring area of the monitoring equipment and obtain the plurality of image frames accordingly from the monitoring equipment. In some embodiments, the processing device 112 may obtain or determine the plurality of image frames from a monitoring video associated with the monitoring area generated by the monitoring equipment. For example, the processing device 112 may perform a framing operation on the monitoring video to obtain the plurality of frames in the monitoring video.

Further, the processing device 112 may determine the at least one target image frame corresponding to the initial time period based on the plurality of image frames. In some embodiments, the processing device 112 may determine the at least one target image frame according to a certain rule. For example, the processing device 112 may extract even-numbered frames from the plurality of image frames that are continuously captured by the monitoring equipment in sequence, and specify each of the even-numbered frames as the at least one target image frame. As another example, the processing device 112 may extract odd-numbered frames from the plurality of image frames that are continuously captured by the monitoring equipment in sequence, and specify each of the odd-numbered frames as the at least one target image frame. As a further example, the processing device 112 may specify a certain number of image frames as a picture group (GOP) and extract one of the at least one target image frame from each GOP. In some embodiments, the processing device 112 may randomly specify the at least one target image frame from the plurality of image frames that are continuously captured by the monitoring equipment in sequence.

In some embodiments, the processing device 112 may determine the at least one target image frame based on a parameter of a light associated with the monitoring equipment. In some embodiments, the light may be integrated into or communicate with the monitoring equipment. In some embodiments, the light may be used for supplementary light and/or alert. For example, the light may provide alert by flickering. The parameter of the light may include a type of the light, a status (e.g., being turned on or turned off) of the light, a flicker frequency of the light, a brightness of the light, a high level duration and a low level duration of the flicker of the light, or the like, or any combination thereof. Merely by way of example, the type of the light may include a monochrome light (a white light, a grapefruit red light), a two-color light (e.g., a red and blue light), a three-color light, or a multi-color light, or the like, or any combination thereof. The flicker frequency of the light may refer to the number of flickers per unit time (e.g., 1 second). In some embodiments, the processing device 112 may determine a required time for the light to implement at least one flicker based on the parameter of the light. Then the processing device 112 may determine a count of the at least one target image frame based on the required time for the light to implement at least one flicker and an exposure time of each target image frame. More descriptions regarding the determining of the at least one target image frame based on the parameter of the light may be found elsewhere in the present disclosure, for example, FIG. 9, and relevant descriptions thereof.

In some embodiments, the processing device 112 may obtain a first image frame and a second image frame associated with the at least one target image frame. In some embodiments, the first image frame, the at least one target image frame, and the second image frame may be consecutive and sequentially captured by the monitoring equipment. Two consecutive images may refer to that no other images are captured between the two images are captured. For example, it is assumed the monitoring equipment sequentially captures image frame 1, image frame 2, image frame 3, . . . , image frame N, image frame N+1, image frame N+2. When the image frame N+1 is specified as the at least one target image frame, the image frame N+2 and the image frame N may be the first image frame and the second image frame, respectively. Further, the processing device 112 may determine the initial time period based on the first image frame and the second image frame.

In some embodiments, the processing device 112 may determine the initial time period based on the first image frame, the second image frame, and the at least one parameter of the monitoring equipment. In some embodiments, the at least one parameter of the monitoring equipment may include frames per second (FPS), a count of rows of an image that are sequentially exposed by a shutter of the monitoring equipment, an exposure interval between two adjacent rows, a shutter time, or a buffer time between two adjacent frames, or the like, or any combination thereof.

In some embodiments, the initial time period may refer to a time period between the first image frame and the second image frame. For example, when the monitoring equipment is a CCD image sensor and a plurality of rows of each image frame are exposed by a shutter of the CCD image sensor at the same time, the initial time period may refer to a time period between an exposure time of the first image frame and an exposure time of the second image frame. An exposure time of an image may include a start exposure time and an end exposure time. Specifically, the processing device 112 may obtain (or determine) an end exposure time of the first image frame and a start exposure time of the second image frame based on the at least one parameter of the monitoring equipment. Further, the processing device 112 may determine the initial time period based on the start exposure time of the second image frame and the end exposure time of the first image frame. For example, the processing device 112 may a time period between the start exposure time of the second image frame and the end exposure time of the first image frame as the initial time period.

As another example, when the monitoring equipment is a CMOS image sensor and a plurality of rows of each image frame are sequentially exposed by the shutter of the CMOS image sensor, the initial time period may refer to a time period between an end exposure time of a last row of the first image frame and a start exposure time of a first row of the second image frame. Specifically, the processing device 112 may obtain (or determine) the end exposure time of the last row of the first image frame and the start exposure time of the first row of the second image frame based on the at least one parameter of the monitoring equipment. Further, the processing device 112 may determine the initial time period based on the end exposure time of the last row of the first image frame and the start exposure time of the first row of the second image frame. For example, the processing device 112 may determine a time period between the start exposure time of the first row of the second image frame and the end exposure time of the last row of the first image frame as the initial time period. More descriptions regarding the determining of the initial time period may be found elsewhere in the present disclosure, for example, FIG. 8, and relevant descriptions thereof.

In some embodiments, the initial time period may be previously determined and stored in the storage device (e.g., the storage device 150, the ROM 230, the RAM 240, and/or the storage 390). The processing device 112 may obtain the initial time period from the storage device via a network (e.g., the network 120).

In 520, the processing device 112 (e.g., the second obtaining module 420) (e.g., the interface circuits or processing circuits of the processor 220) may obtain a warning scheme associated with the initial time period.

The warning scheme may include controlling an operation of the light associated with the monitoring equipment within at least one candidate time period in the initial time period. In some embodiments, the at least one candidate time period may be set by, e.g., a user (e.g., an engineer) empirically or according to an actual need. For example, the at least one candidate time period may be any time period within the initial time period. As an example, the at least one candidate time period may be the same as the initial time period. The operation of the light associated with the monitoring equipment may include flicker. In some embodiments, the processing device 112 may control the light to flicker within the at least one candidate time period based on the parameter of the light.

Figure 6:
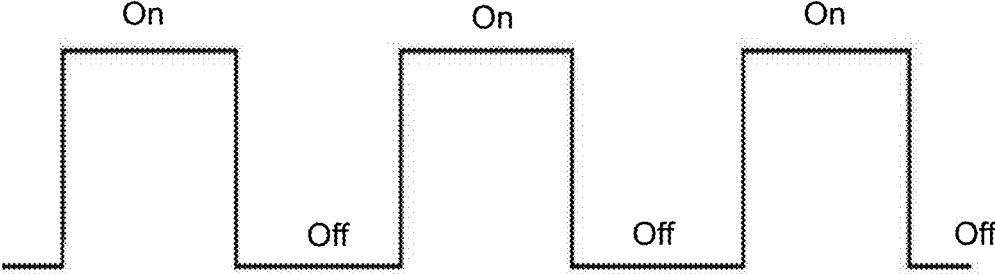
FIG. 6 is a schematic diagram illustrating an exemplary operation of a light associated with the monitoring equipment according to some embodiments of the present disclosure.

In some embodiments, the processing device 112 may determine whether the light associated with the monitoring equipment is turned on (which indicates whether an environmental brightness meets monitoring requirements). If the light associated with the monitoring equipment is turned off, it may indicate that the environmental brightness is relatively high and the light is not used for supplementary light. In such case, as shown in FIG. 6, the processing device 112 may control the light turn on and off alternately within the at least one candidate time period, so as to realize a flicker of the light (i.e., realize a warning function). If the light associated with the monitoring equipment is turned on, it may indicate that the environmental brightness is relatively low and the light may be used for supplementary light. In such case, the processing device 112 may increase and decrease a brightness of the light alternately within the at least one candidate time period, so as to realize a flicker of the light (i.e., realize a warning function) under the premise of ensuring that brightness can meet monitoring requirements.

In some embodiments, the processing device 112 may determine the type of the light and control the light to flicker within the at least one candidate time period based on the type of the light. For example, if the type of the light is a two-color light (e.g., a red and blue light), the processing device 112 may control the color of the light to change between red and blue, so as to realize a flicker of the light (i.e., realize a warning function). As another example, if the type of the light is a monochrome light, the processing device 112 may control the light turn on and off alternately (or increase and decrease a brightness of the light alternately), so as to realize a flicker of the light (i.e., realize a warning function).

In some embodiments, the processing device 112 may determine the flicker frequency of the light and realize a warning by changing the flicker frequency of the light within the at least one candidate time period. In some embodiments, the processing device 112 may change the flicker frequency of the light by changing the high level duration and/or the low level duration of the flicker of the light.

In some embodiments, the processing device 112 may obtain a distance between the monitoring equipment and a monitoring area of the monitoring equipment where an abnormal event occurs and controlling at least one of the flicker frequency or the brightness of the light based on the parameter of the light and the distance. Merely by way of example, the abnormal event may include an object appearing in the monitoring area, a fire breaking out, an object displacement, a conflict, or an accident, or the like, or any combination thereof. The object may include a biological object and/or a non-biological object. The biological object may include a person, an animal, a plant, or the like, or any combination thereof. The non-biological object may include a natural product (e.g., a stone), an artifact (e.g., an industrial component), or the like, or any combination thereof. More descriptions regarding the controlling of the operation of the light based on the parameter of the light may be found elsewhere in the present disclosure, for example, FIG. 11 and relevant descriptions thereof.

In some embodiments, the processing device 112 may adjust, based on the parameter of the light, the initial time period by adjusting the at least one parameter of the monitoring equipment; and control the operation of the light within at least one candidate time period in the adjusted initial time period. In some embodiments, the processing device 112 may determine a required initial time period based on the required time of the operation (e.g., flicker) of the light. The processing device 112 may determine whether the initial time period is less than the required initial time period. If the initial time period is less than the required initial time period, the processing device 112 may adjust the at least one parameter of the monitoring equipment to adjust the initial time period to make the adjusted initial time period is larger than or equal to the required initial time period.

In some embodiments, the operation (e.g., flicker) of the light may cause a change (e.g., a brightness change) of the monitoring environment of the monitoring equipment, which may affect the monitoring effect (e.g., a brightness change of a monitoring picture) of the monitoring equipment. Specifically, the at least one target image frame is obtained by the monitoring equipment during the operation (e.g., flicker) of the light. Therefore, the at least one target image frame may be affected by the operation (e.g., flicker) of the light. In order to reduce or eliminate the impact of the operation (e.g., flicker) of the light on the at least one target image frame, the warning scheme may further include processing the at least one target image frame. In some embodiments, the processing device 112 may discard the at least one target image frame from the plurality of image frames that have been captured by the monitoring equipment, so that the at least one target image frame would not be presented on a monitoring screen (or a display) of the monitoring equipment. As a result, the monitoring picture of the monitoring equipment may be not affected by the operation (e.g., flicker) of the light. As used herein, the "discard" indicates remove or delete the at least one target image frame from the plurality of image frames that have been captured by the monitoring equipment. The monitoring picture of the monitoring equipment may refer to images or video presented on a display or a monitoring screen of the monitoring equipment.

Figure 7A:
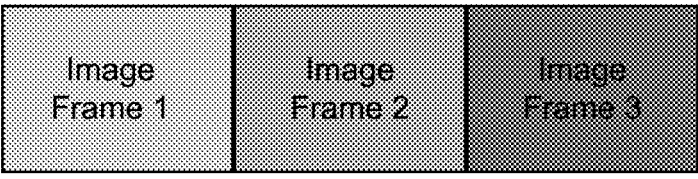
FIG. 7A-C are schematic diagrams illustrating exemplary processing of at least one target image frame according to some embodiments of the present disclosure.
Figure 7B:
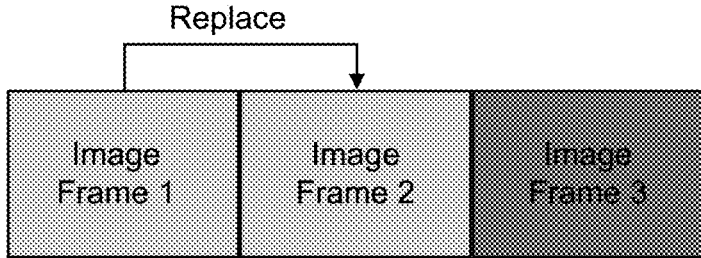
Figure 7C:
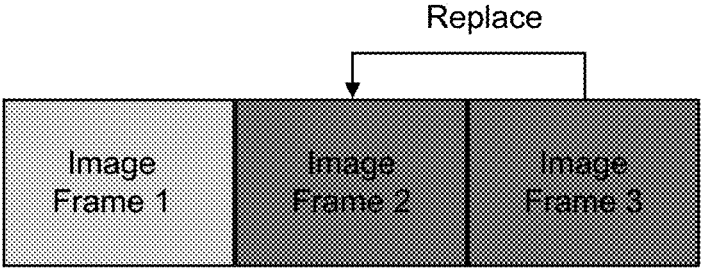

In some embodiments, the processing device 112 may replace the at least one target image frame with one or more image frames (e.g., frames are not affected by the operation of the light) among the plurality of image frames that have been captured by the monitoring equipment. For example, the processing device 112 may replace the at least one target image frame with at least one of the first image frame or the second image frame. FIG. 7A-C are schematic diagrams illustrating exemplary processing of at least one target image frame according to some embodiments of the present disclosure. As shown in FIG. 7A, an image frame 1, an image frame 2, and an image frame 3 may be a portion of the plurality of image frames that have been captured sequentially by the monitoring equipment. The image frame 1, the image frame 2, and the image frame 3 may be the first image frame, the at least one target image frame, and the second image frame, respectively. As shown in FIG. 7B, the processing device 112 may process the at least one target image frame (i.e., the image frame 2), by replacing the image frame 2 with the image frame 1. As shown in FIG. 7C, the processing device 112 may the at least one target image frame (i.e., the image frame 2) by replacing the image frame 2 with the image frame 3. In such case, the at least one target image frame is replaced with other image frames (e.g., the first image frame, the second frame) that is not affected by the operation (e.g., flicker) of the light. As a result, the monitoring picture of the monitoring equipment is not affected by the operation (e.g., flicker) of the light.

In some embodiments, a count of the at least one target image frame may be less than or equal to 3. The count of the at least one target image frame may be much less than a count of the plurality of image frames that have been captured by the monitoring equipment. For example, when the processing device 112 specifies a certain number of image frames as a picture group (GOP) and extracts the at least one target image frame from each GOP, the count of the at least one target image frame may be much less than a count of image frames in the GOP. Therefore, compared to the entire GOP, the discarded or replaced image frame may be relatively small, which may reduce a loss of key information in the monitoring video generated by the monitoring equipment and the sense of jump on the monitoring picture caused by the discarding or replacement of the at least one target image frame, thereby maintaining the fluency of the monitoring picture (or video).

In some embodiments, the processing device 112 may process the at least one target image frame by adjust a brightness of the at least one target image frame. For example, the processing device 112 may adjust the brightness of the at least one target image frame based on the one or more image frames (e.g., the frames are not affected by the operation of the light) among the plurality of image frames that have been captured by the monitoring equipment. As another example, the processing device 112 may increase or decrease the brightness of the at least one target image frame based on the brightness of at least one of the first image frame or the second image frame. Compared with discarding or replacing the at least one target image frame, the operation of adjusting the brightness of the at least one target image frame may avoid the impact on the fluency of the monitoring picture (or video) of the monitoring equipment while not affecting the brightness of the monitoring picture of the monitoring equipment.

In some embodiments, the warning scheme may be previously determined and stored in the storage device (e.g., the storage device 150, the ROM 230, the RAM 240, and/or the storage 390). The processing device 112 may obtain the warning scheme from the storage device via a network (e.g., the network 120).

After the at least one target image frame that may be impacted by the operation (e.g., flicker) of the light is processed, the monitoring picture of the monitoring equipment would not change obviously between light and dark. Specifically, when a brightness of a monitoring environment of the monitoring equipment is relatively stable (e.g., there is no change obviously in the brightness of the environment), a brightness change in the at least one target image frame may be less than or equal to a threshold. The threshold may be a default setting of the video surveillance system 100 or may be adjustable under different situations. In some embodiments, the threshold may be an empirical value. In some embodiments, the threshold may be set according to a perception of the brightness of an image by a naked eye of ordinary people. In some embodiments, the threshold may be previously determined and stored in a storage device (e.g., the storage device 150, the ROM 230, the RAM 240, and/or the storage 390). The processing device 112 may obtain the threshold from the storage device via a network (e.g., the network 120).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation, a transmitting operation) may be added elsewhere in the process 500. In the storing operation, the processing device 112 may store information and/or data (e.g., the plurality of image frames that have been captured by the monitoring equipment, at least one parameter of the monitoring equipment, the initial time period, the warning scheme, a plurality of processed image frames in which the at least one target image frame, etc.) associated with the video surveillance in a storage device (e.g., the storage device 150, the storage 220, the storage 390) disclosed elsewhere in the present disclosure. In the transmitting operation, the processing device 112 may transmit the plurality of processed image frames in which the at least one target image frame has been processed and/or the abnormal event that occurs in the monitoring area to the user device 140.

Figure 8:
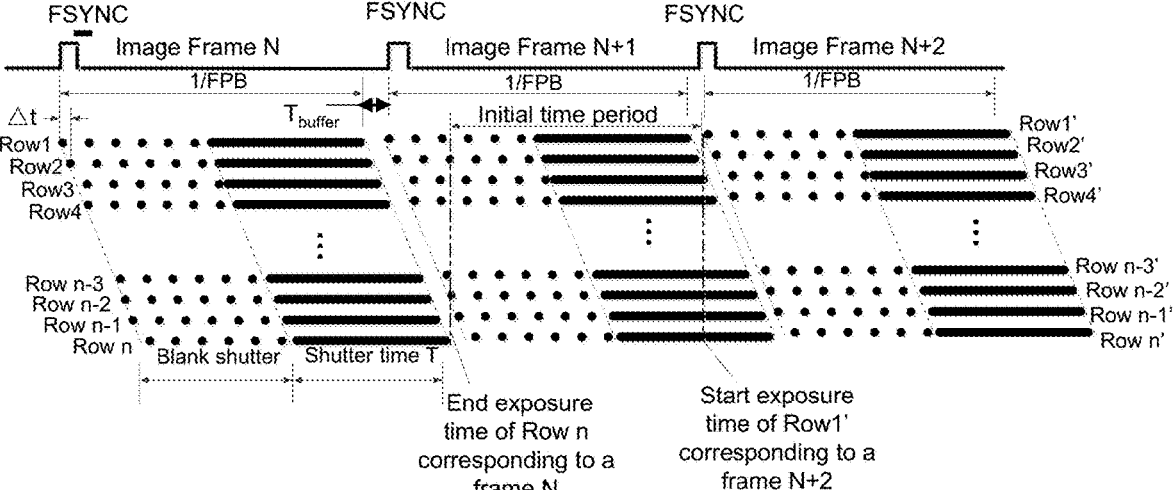
FIG. 8 is a schematic diagram illustrating exemplary rows corresponding to three consecutive image frames of a monitoring equipment according to some embodiments of the present disclosure.

FIG. 8 is a schematic diagram illustrating exemplary rows corresponding to three consecutive image frames of a monitoring equipment according to some embodiments of the present disclosure.

It is assumed that the monitoring equipment is the CMOS image sensor and a plurality of image frames (e.g., an image frame N, an image frame N+1, an image frame N+2) may be sequentially exposed by the shutter of the CMOS image sensor. Each of the plurality of image frames may include a plurality of rows (e.g., Raw1, Row2, Row3, Row4, . . . , Row n−3, Row n−2, Row n−1, and Row n corresponding to the image frame N; Row1', Row2', Row3', Row4', . . . , Row n−3', Row n−2', Row n−1', and Row n' corresponding to the image frame N+2). As illustrated in FIG. 8, the exposure interval between two adjacent rows in a same image frame may also be denoted as Δt. For example, the exposure interval Δt may be an interval between a start exposure time of one of the two adjacent rows in the image frame and a start exposure time of another of the two adjacent rows in the image frame. As another example, the exposure interval Δt may be an interval between an end exposure time of one of the two adjacent rows in the image frame and an end exposure time of another of the two adjacent rows in the image frame. A time period (i.e., 1/FPS) for the monitoring equipment to capture one image frame (e.g., the image frame N, the image frame N+1, the image frame N+2) may include a blank shutter time and a shutter time T (i.e., an exposure time of an image frame). For example, when the FPS is 25 HZ, the time period for the monitoring equipment to capture one image frame may be ½ss (i.e., 40 ms). If the shutter time T is 20 ms, the blank shutter time may be (40-20)ms. FSYNC (Frame Sync) may be a start signal of capturing an image frame (e.g., the image frame N, the image frame N+1, the image frame N+2). A buffer time between two adjacent frames (e.g., the frame N and the frame N+1) may be denoted as $T_{buffer}$. For example, a time period between an end exposure time of a first row 1 corresponding to the image frame N and the start signal of capturing the image frame N+1 may be the buffer time $T_{buffer}$.

In some embodiments, when the image frame N+1 is specified as the at least one target image frame, the image frame N and the image frame N+2 may be a first image frame and a second image frame, respectively. The initial time period may be determined based on an end exposure time of a last row of the image frame N and a start exposure time of a first row of the image frame N+2.

It is assumed that a start exposure time of the image frame N is 0, accordingly, a start exposure time of a first row1 corresponding to the image frame N is 1/FPS-T, a start exposure time of a last row n corresponding to the image frame N is (1/FPS—T)+(n−1)*Δt, an end exposure time of the last row n corresponding to the image frame N is (1/FPS−T)+(n−1)*Δt+T (i.e., 1/FPS+(n−1)*Δt, and a start exposure time of a first row1' corresponding to the image frame N+2 is 2*(1/FPS+$T_{buffer}$)+(1/FPS-T). A difference between the start exposure time of the first row1' corresponding to the image frame N+2 and the end exposure time of the last row n corresponding to the image frame N is (2*(1/FPS+$T_{buffer}$)+(1/FPS-T))−(1/FPS+(n−1)*Δt) (i.e., 2*(1/FPS+$T_{buffer}$)−((n−1)*Δt+T)), which may be used as the initial time period in which a warning scheme may be executed. Specifically, a light associated with the monitoring equipment may be controlled to flicker within at least one candidate time period (e.g., any time period within the initial time period) in the initial time period and at least one target image frame (i.e., the image frame N+1) may be processed (e.g., directly discarded or replaced with image frame N/image frame N+2). Since the at least one target image frame (i.e., the image frame N+1) is captured by the monitoring equipment between the end exposure time of the last row n corresponding to the image frame N and the start exposure time of the first row1' corresponding to the image frame N+2, the flicker of the light associated with the monitoring equipment would not affect the image frame N and the image frame N+2. Therefore, the image frame N+1 (i.e., the at least one target image frame) that is affected by the flicker of the light may be processed, which can ensure that a monitoring picture (e.g., a brightness) of the monitoring equipment would not be affected by the flicker of the light, for example, a flicker would not appear in the monitoring picture, thereby realizing both the warning function and the supplementary light function.

In some embodiments, the processing device 112 may determine whether the determined initial time period is less than a required time for the light to implement at least one flicker. If the determined initial time period is less than the required time for the light to implement at least one flicker, the processing device 112 may adjust the at least one parameter (e.g., FPS, a count (i.e., n) of the rows, the exposure interval Δt between two adjacent rows, the buffer time ($T_{buffer}$) between two adjacent frames, the shutter time T) of the monitoring equipment to adjust the initial time period, thereby making the adjusted initial time period larger than or equal to the required time for the light to implement at least one flicker. For example, the processing device 112 may reduce the shutter time T to increase the initial time period to make the increased initial time period larger than or equal to the required time for the light to implement at least one flicker. As another example, the processing device 112 may reduce the shutter time T and/or the FPS to increase the initial time period.

In some situations, the reduction of the shutter time T may cause a limited performance of the monitoring equipment. For example, in the case of low ambient brightness, when the shutter time T is reduced, a brightness detected by the monitoring equipment may be reduced, which may reduce a brightness of a monitoring picture of the monitoring equipment and result in unclarity of objects presented in the monitoring picture. Accordingly, in some embodiments, in addition to the light, the monitoring equipment may also include a fill light used to supplement light. When the shutter time T is reduced, the processing device 112 may increase a brightness and/or an exposure gain value of the fill light so that the monitoring equipment may receive sufficient brightness. Accordingly, in the case of low ambient brightness, the brightness of the monitoring picture will not be affected by the reduction of the shutter time T.

Figure 9:
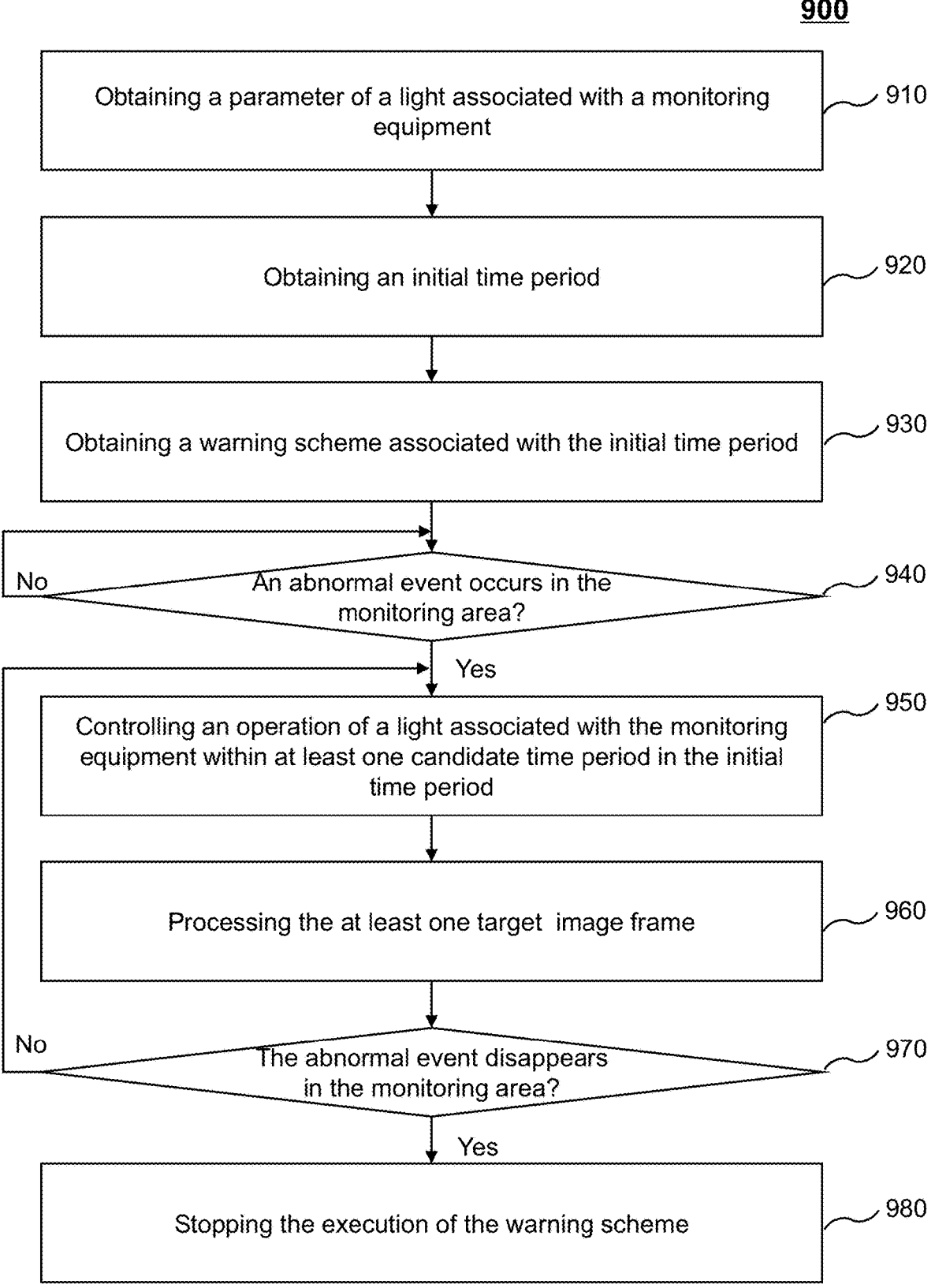
FIG. 9 is a flowchart illustrating an exemplary process for video surveillance according to some embodiments of the present disclosure.

FIG. 9 is a flowchart illustrating an exemplary process for video surveillance according to some embodiments of the present disclosure. In some embodiments, process 900 may be executed by the video surveillance system 100. For example, the process 900 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 910, the processing device 112 (e.g., the first obtaining module 410 illustrated in FIG. 4) (e.g., the interface circuits of the processor 220) may obtain a parameter of a light associated with a monitoring equipment (e.g., the monitoring equipment 130).

As described in connection with FIG. 5, the light may be integrated into or communicate with a monitoring equipment. The light may be used for supplementary light and/or alert. The parameter of the light may include a type (e.g., a monochrome light, a two-color light, a three-color light, or a multi-color light) of the light, a status (e.g., being turned on or turned off) of the light, a flicker frequency of the light, a brightness of the light, a high level duration and a low level duration of the flicker of the light, or the like, or any combination thereof.

In some embodiments, the processing device 112 may directly obtain the parameter of the light from the light via a network (e.g., the network 120). In some embodiments, the processing device 112 may obtain the parameter of the light via the monitoring equipment. For example, the processing device 112 may direct the monitoring equipment to obtain the parameter of the light and further transmit the parameter of the light to the processing device 112. In some embodiments, the parameter of the light may be previously obtained and stored in the storage device (e.g., the storage device 150, the ROM 230, the RAM 240, and/or the storage 390). The processing device 112 may obtain the parameter of the light from the storage device via a network (e.g., the network 120).

In 920, the processing device 112 (e.g., the first obtaining module 410 illustrated in FIG. 4) (e.g., the processing circuits of the processor 220) may obtain an initial time period. The obtaining of the initial time period may be performed in a similar manner as operation 510, and relevant descriptions are not repeated here.

In some embodiments, the processing device 112 may determine at least one target image frame based on the parameter of the light and determine the initial time period based on the at least one target image frame. In some embodiments, the processing device 112 may determine a required time for the light to implement at least one flicker based on the parameter of the light. Then the processing device 112 may determine the at least one target image frame based on the required time for the light to implement at least one flicker. In some embodiments, a time period during which the at least one target image frame is sequentially captured by the monitoring equipment should be larger than or equal to the required time for the light to implement at least one flicker. Therefore, according to a shutter time T (i.e., an exposure time of each image frame) of the monitoring equipment and the required time for the light to implement at least one flicker, the processing device 112 may determine a count of the at least one target image frame. Then, the processing device 112 may determine the at least one target image frame in a similar manner as operation 510. For example, the processing device 112 may randomly specify the at least one target image frame from a plurality of image frames that are continuously captured by the monitoring equipment in sequence. After determining the at least one target image frame, the processing device 112 may determine the initial time period in a similar manner as operation 510.

In 930, the processing device 112 (e.g., the second obtaining module 420) (e.g., the interface circuits or processing circuits of the processor 220) may obtain a warning scheme associated with the initial time period. Operation 930 may be performed in a similar manner as operation 520, and relevant descriptions are not repeated here.

In 940, the processing device 112 (e.g., the execution module 430) (e.g., the interface circuits or processing circuits of the processor 220) may obtain one or more image frames associated with a monitoring area captured by the monitoring equipment and determine whether an abnormal event occurs in the monitoring area based on the one or more image frames.

In some embodiments, the processing device 112 may direct the monitoring equipment to sequentially capture the one or more image frames associated with the monitoring area of the monitoring equipment and obtain the one or more image frames accordingly. In some embodiments, the processing device 112 may obtain or determine the one or more image frames from a monitoring video associated with the monitoring area captured by the monitoring equipment. As described in connection with FIG. 5, the abnormal event may include an object appearing in the monitoring area (e.g., an object entering a monitoring picture of the monitoring equipment), a fire breaking out, an object displacement, a conflict, or an accident, or the like, or any combination thereof.

In some embodiments, the processing device 112 may determine the at least one target image frame based on the one or more image frames. For example, the processing device 112 may designate any one of the one or more image frames as the at least one target image frame. As another example, the processing device 112 may designate image frame(s) separated by a certain number of image frames from one or more image frames as the at least one image frame. As used herein, the certain number may be less than a certain threshold (e.g., 5, 10, 20, etc.).

After obtaining the one or more image frames, the processing device 112 may determine whether the abnormal event occurs in the monitoring area in real-time. For example, when an image frame is obtained, the processing device 112 may determine whether the abnormal event occurs in the image frame. In response to determining that the abnormal event does not occur in the image frame, the processing device 112 may obtain a next image frame. In response to determining that the abnormal event occurs in the image frame, the processing device 112 may execute the warning scheme (i.e., operations 950-960).

In 950, the processing device 112 (e.g., the execution module 430) (e.g., the processing circuits of the processor 220) may control an operation of the light associated with the monitoring equipment within at least one candidate time period in the initial time period. The controlling of the operation of the light may be performed in a similar manner as operation 520, and relevant descriptions are not repeated here.

In 960, the processing device 112 (e.g., the execution module 430) (e.g., the processing circuits of the processor 220) may process the at least one target image frame corresponding to the initial time period. The processing of the at least one target image frame may be performed in a similar manner as operation 520, and relevant descriptions are not repeated here.

In 970, the processing device 112 (e.g., the execution module 430) (e.g., the processing circuits of the processor 220) may determine whether the abnormal event disappears in the monitoring area based on the one or more image frames. In response to determining that the abnormal event does not disappear in the monitoring area, the processing device 112 may proceed to the execution of the warning scheme, that is proceed to the execution of operations 950-960. In response to determining that the abnormal event disappears in the monitoring area, the processing device 112 may proceed to operations 980

In 980, the processing device 112 (e.g., the execution module 430) (e.g., the processing circuits of the processor 220) may stop the execution of the warning scheme, that is stop the execution of operations 950-960. Further, the processing device 112 may proceed to operation 940 to continue to detect whether a next abnormal event occurs in the monitoring area.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 10 is a flowchart illustrating an exemplary process for video surveillance according to some embodiments of the present disclosure. In some embodiments, process 1000 may be executed by the video surveillance system 100. For example, the process 1000 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In 1010, at least one exposure parameter and frames per second (FPS) of a monitoring equipment (e.g., the monitoring equipment 130) may be obtained. Further, an initial time period may be determined based on the at least one exposure parameter and the FPS of the monitoring equipment. In some embodiments, operation 1010 may be performed by the processing device 112 (e.g., the first obtaining module 410 illustrated in FIG. 4) (e.g., the interface circuits or processing circuits of the processor 220).

In some embodiments, the at least one exposure parameter of the monitoring equipment may include parameters of the monitoring equipment disclosed elsewhere in the present disclosure other than FPS. Merely by way of example, the at least one exposure parameter of the monitoring equipment may include a count of rows of an image that are sequentially exposed by a shutter of the monitoring equipment, an exposure interval between two adjacent rows, a shutter time, or a buffer time between two adjacent frames, or the like, or any combination thereof.

As described in connection with FIG. 5, the initial time period may correspond to at least part of a time period during which at least one target image frame is captured by the monitoring equipment. In some embodiments, a time period (i.e., 1/FPS) for the monitoring equipment to capture one image frame may be obtained based on the FPS of the monitoring equipment. A start exposure time and an end exposure time of each image frame may be determined based on the at least one exposure parameter of the monitoring equipment and the time period for the monitoring equipment to capture one image frame. In some embodiments, the monitoring equipment may capture image frames according to a timing sequence. In some embodiments, a time period between an end exposure time of a first image frame that has a previous timing sequence relative to the at least one target image frame and a start exposure time of a second image frame that has a subsequent timing sequence relative to the at least one target image frame may be used as the initial time period. It should be noted that the first image frame and the second image frame may be respectively adjacent to the at least one target image frame and an exposure time (i.e., the shutter time) of the first image frame and the second image frame does not overlap with an exposure time of the at least one target image frame.

In some embodiments, a type of the monitoring equipment may be obtained. Further, the at least one exposure parameter and/or an exposure manner may be determined based on the type of the monitoring equipment. For example, the rows of an image that are sequentially exposed by the shutter of the monitoring equipment, the count of the rows, and the exposure interval between two adjacent rows may be determined based on the type of the monitoring equipment. In some embodiments, the type of the monitoring equipment may be a CCD image sensor (also referred to as a CCD camera) or a CMOS image sensor (also referred to as a CMOS camera). An exposure manner of the CCD image sensor may be global exposure, that is, exposure rows may be exposed by the CCD image sensor at the same time. An exposure manner of the CMOS image sensor may be progressive exposure, that is, exposure rows may be sequentially exposed by the CMOS image sensor. As described in connection with FIG. 5, when the monitoring equipment is the CCD image sensor, the initial time period may refer to a time period between an exposure time of the first image frame and an exposure time of the second image frame; when the monitoring equipment is the CMOS image sensor, the initial time period may refer to a time period between an end exposure time of a last row of the first image frame and a start exposure time of a first row of the second image frame. Since the at least one target image frame is captured by the monitoring equipment between the end exposure time of the last row of the first image frame and the start exposure time of the first row of the second image frame, a flicker of a light associated with the monitoring equipment in the initial time period would not affect the first image frame and the second image frame.

In 1020, a warning scheme associated with the initial time period may be set. In some embodiments, operation 1020 may be performed by the processing device 112 (e.g., the second obtaining module 420 illustrated in FIG. 4) (e.g., the interface circuits or processing circuits of the processor 220).

As described in connection with FIG. 5, the warning scheme may include controlling an operation of the light associated with the monitoring equipment within at least one candidate time period in the initial time period. The controlling of the operation of the light may be performed in a similar manner as operation 520, and relevant descriptions are not repeated here.

As described in connection with FIG. 5, the warning scheme may further include processing the at least one target image frame. The processing of the at least one target image frame may be performed in a similar manner as operation 520, and relevant descriptions are not repeated here.

In 1030, in response to determining that the abnormal event occurs in the monitoring area, the warning scheme may be executed. In some embodiments, operation 1020 may be performed by the processing device 112 (e.g., the execution module 430 illustrated in FIG. 4) (e.g., the processing circuits of the processor 220). Operation 1030 may be performed in a similar manner as operations 940-980, and relevant descriptions are not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 11 is a flowchart illustrating an exemplary process for video surveillance according to some embodiments of the present disclosure. In some embodiments, process 1100 may be executed by the video surveillance system 100. For example, the process 1100 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 1100. The operations of the illustrated process presented below are intended to be illustrative. In some embodiments, the process 1100 may be accomplished with one or more additional operations not described and/or without one or more of the operations discussed. Additionally, the order of the operations of process 1100 illustrated in FIG. 11 and described below is not intended to be limiting.

In 1110, an end exposure time of a last row of a first image frame and a start exposure time of a first row of a second image frame may be determined based on at least one exposure parameter and frames per second (FPS) of a monitoring equipment (e.g., the monitoring equipment 130). In some embodiments, operation 1110 may be performed by the processing device 112 (e.g., the first obtaining module 410 illustrated in FIG. 4) (e.g., the processing circuits of the processor 220). More descriptions regarding the first image frame and the second image frame may be found elsewhere in the present disclosure, for example, FIG. 5, FIG. 8, FIG. 10, and relevant descriptions thereof.

In some embodiments, the start exposure time of the first row of the second image may be larger than the end exposure time of the last row of the first image frame. At least one target image frame may be provided between the first image frame and the second image frame. More descriptions regarding the determination of the end exposure time of the last row of the first image frame and the start exposure time of the first row of the second image may be found elsewhere in the present disclosure, for example, FIG. 8 and relevant descriptions thereof.

In some embodiments, the at least one exposure parameter and the FPS of the monitoring equipment may be obtained from the monitoring equipment in real-time, which may reduce the impact of the work delay of the monitoring equipment and the fluctuation of the FPS on the determination of the end exposure time of the last row of the first image frame and the start exposure time of the first row of the second image, thereby improving the accuracy of the determination of the end exposure time of the last row of the first image frame and the start exposure time of the first row of the second image.

In 1120, an initial time period may be determined based on a time period between the start exposure time of the first row of the second image and the end exposure time of the last row of the first image frame. In some embodiments, operation 1120 may be performed by the processing device 112 (e.g., the first obtaining module 410 illustrated in FIG. 4) (e.g., the processing circuits of the processor 220). In some embodiments, the initial time period may be less than or equal to the time period between the start exposure time of the first row of the second image and the end exposure time of the last row of the first image frame. More descriptions regarding the determination of the initial time period may be found elsewhere in the present disclosure, for example, FIG. 8 and relevant descriptions thereof.

In 1130, a type of a light associated with a monitoring equipment may be obtained. Further, a flicker timing and an electrical level parameter of the light may be determined based on the type of the light. In some embodiments, operation 1030 may be performed by the processing device 112 (e.g., the second obtaining module 420 illustrated in FIG. 4) (e.g., the interface circuits or processing circuits of the processor 220).

In some embodiments, the flicker timing may refer to a parameter related to a flicker of the light. For example, when the type of the light is a monochrome light (a white light, a grapefruit red light), the flicker timing of the light may be a flicker frequency of the light. As another example, when the type of the light is a two-color light (e.g., a red and blue light), the flicker timing of the light may a flicker frequency of each color of the light and/or a flicker manner of the two colors of the light. Merely by way of example, the flicker manner of the two colors of the light may include the two colors of the light flicker alternately, only one of the two colors of the light flickers, one of the two colors of the light flickers more frequently than the other, etc. In some embodiments, the electrical level parameter of the light may include a high level duration and a low level duration of the flicker of the light, etc. In some embodiments, different lights have different flicker timing and different electrical level parameters.

In 1140, a warning scheme associated with the initial time period may be set based on the flicker timing and the electrical level parameter of the light. In some embodiments, operation 1040 may be performed by the processing device 112 (e.g., the second obtaining module 420 illustrated in FIG. 4) (e.g., the processing circuits of the processor 220).

As described in connection with FIG. 5, the warning scheme may include controlling an operation (e.g., a flicker) of the light associated with the monitoring equipment within at least one candidate time period in the initial time period. In some embodiments, a flicker frequency and a brightness of the light may be set based on the flicker timing and the electrical level parameter of the light, which may improve the accuracy of the warning scheme. In some embodiments, a distance between the monitoring equipment and a monitoring area of the monitoring equipment where an abnormal event occurs may be obtained. Further, at least one of a flicker frequency or a brightness of the light may be controlled based on the parameter of the light and the distance. Specifically, the distance may be divided into a plurality of distance sections. The flicker frequency and a brightness of the light may be set to be different in different distance sections based on the flicker timing and the electrical level parameter of the light, respectively. For example, the distance may be divided into 3 distance sections. The closer distance section from the monitoring equipment, the higher the flicker frequency of the light, the brighter the brightness of the light, which serves as an incremental warning to an object (also referred as to an "invasive object") associated with the abnormal event that is constantly approaching. In some embodiments, when the object enters the closest distance section from the monitoring equipment, a predetermined sound may be played to further warn or drive the object, which may enhance the warning effect.

As described in connection with FIG. 5, the warning scheme may further include processing the at least one target image frame, wherein the processing the at least one target image frame may include discarding the at least one target image frame from a plurality of image frames that have been captured by the monitoring equipment or replacing the at least one target image frame with one or more image frames among the plurality of image frames.

In some embodiments, when a count of the at least one target image frame between the first image frame and the second image frame is less than or equal to a threshold, the at least one target image frame may be discarded. The threshold may be set by, e.g., a user (e.g., an engineer) empirically or according to an actual need. In some embodiments, the threshold may be a value much less than a count of the plurality of image frames that have been captured by the monitoring equipment, so that the discarding of at least one target image frame would not affect the fluency of the monitoring picture. In some embodiments, when the count of the at least one target image frame is larger than the threshold, the at least one target image frame may be replaced with the one or more image frames among the plurality of image frames, which may reduce a loss of information in the monitoring video generated by the monitoring equipment, thereby maintaining the fluency of the monitoring picture. In some embodiments, a portion of the at least one target image frame may be replaced with the first image frame; other portion of the at least one target image frame may be replaced with the second image frame. For example, the at least one target image frame may be divided into two portions evenly or in a certain proportion. The portion of the at least one target image frame close to the first image frame may be replaced with the first image frame. The portion of the at least one target image frame close to the second image frame may be replaced with the second image frame.

In 1150, in response to determining that the abnormal event occurs in the monitoring area, the warning scheme may be executed. In some embodiments, operation 1020 may be performed by the processing device 112 (e.g., the execution module 430 illustrated in FIG. 4) (e.g., the processing circuits of the processor 220). Operation 1150 may be performed in a similar manner as operations 940-980, and relevant descriptions are not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide an electronic device. The electronic device may include at least one storage device and at least one processor in communication with the at least one storage device. The at least one storage device may store program data. The program data may be executed by the at least one processor to implement a process (e.g., process 500, process 900, process 1000, process 1100) described elsewhere in the present disclosure.

In some embodiments, the present disclosure may also provide a computer readable storage medium storing program data. The program data may be executed to implement a process (e.g., process 500, process 900, process 1000, process 1100) described elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:

at least one storage device including a set of instructions; and at least one processor in communication with the at least one storage device, wherein when executing the set of instructions, the at least one processor is directed to perform operations including:

obtaining, based on at least one parameter of a monitoring equipment, an initial time period corresponding to at least part of a time period during which at least one target image frame is captured by the monitoring equipment, wherein the at least one parameter of the monitoring equipment includes frames per second (FPS), a count $n$ of rows that are sequentially exposed by a shutter of the monitoring equipment, an exposure interval $\Delta t$ between two adjacent rows, a shutter time T, and a buffer time $T_{buffer}$ between two adjacent frames, and the initial time period is obtained by:

obtaining a first image frame and a second image frame associated with the at least one target image frame, wherein the first image frame, the at least one target image frame, and the second image frame are sequentially captured by the monitoring equipment;

obtaining an end exposure time of a last row among a plurality of rows of the first image frame that are sequentially exposed by the shutter of the monitoring equipment;

obtaining a start exposure time of a first row among a plurality of rows of the second image frame that are sequentially exposed by the shutter of the monitoring equipment, wherein it is assumed that a start exposure time of the first image frame is 0, the end exposure time of the last row corresponding to the first image frame is $(1/FPS)+ (n-1)*\Delta t$, and the start exposure time of the first row corresponding to the second image frame is $(3/FPS)+(2T_{buffer})-T$; and determining the initial time period based on a difference between the end exposure time of the last row of the first image frame and the start exposure time of the first row of the second image frame; and obtaining a warning scheme associated with the initial time period, wherein the warning scheme includes:

controlling an operation of a light associated with the monitoring equipment within at least one candidate time period in the initial time period by:

setting different flashing schemes of the light according to a switch status of the light by:

determining whether the light is turned on, wherein the light being turned on indicates that an environmental brightness is relatively low and the light is used for supplementary light, and the light being turned off indicates that the environmental brightness is relatively high and the light is not used for supplementary light;

if the light is turned off, controlling the light to turn on and off alternately within the at least one candidate time period so as to realize a flicker of the light; and if the light is turned on, increasing and decreasing a brightness of the light alternately within the at least one candidate time period so as to realize the flicker of the light under a premise of ensuring that the environmental brightness can meet monitoring requirements; and processing the at least one target image frame.

2. The system of claim 1, wherein the controlling the operation of the light associated with the monitoring equipment within at least one candidate time period in the initial time period includes:

controlling the light to flicker within the at least one candidate time period based on a parameter of the light.

3. The system of claim 2, wherein the controlling the light to flicker within the at least one candidate time period based on the parameter of the light includes:

obtaining a distance between the monitoring equipment and a monitoring area of the monitoring equipment where an abnormal event occurs; and controlling at least one of a flicker frequency or a brightness of the light based on the parameter of the light and the distance.

4. The system of claim 1, wherein the processing the at least one target image frame includes:

when a count of the at least one target image frame is less than or equal to a threshold, discarding the at least one target image frame from a plurality of image frames that have been captured by the monitoring equipment; and when the count of the at least one target image frame is larger than the threshold, replacing the at least one target image frame with one or more image frames among the plurality of image frames.

5. The system of claim 4, wherein the replacing the at least one target image frame with one or more image frames among the plurality of image frames includes:

replacing the at least one target image frame with at least one of a first image frame or a second image frame.

6. The system of claim 1, wherein the at least one processor is directed to perform operations further including:

obtaining one or more image frames associated with a monitoring area captured by the monitoring equipment, the at least one target image frame being determined based on the one or more image frames;

determining whether an abnormal event occurs in the monitoring area based on the one or more image frames; and in response to determining that the abnormal event occurs in the monitoring area, executing the warning scheme.

7. The system of claim 6, wherein the abnormal event includes at least one of an object appearing in the monitoring area, a fire breaking out, an object displacement, a conflict, or an accident.

8. The system of claim 6, wherein the at least one processor is directed to perform operations further including:

determining whether the abnormal event disappears in the monitoring area based on the one or more image frames; and in response to determining that the abnormal event disappears in the monitoring area, stopping execution of the warning scheme.

9. A method implemented on a computing device including at least one processor, at least one storage medium, and a communication platform connected to a network, the method comprising:

obtaining, based on at least one parameter of a monitoring equipment, an initial time period corresponding to at least part of a time period during which at least one target image frame is captured by the monitoring equipment, wherein the at least one parameter of the monitoring equipment includes frames per second (FPS), a count n of rows that are sequentially exposed by a shutter of the monitoring equipment, an exposure interval $\Delta t$ between two adjacent rows, a shutter time T, and a buffer time $T_{buffer}$ between two adjacent frames, and the initial time period is obtained by:

obtaining a first image frame and a second image frame associated with the at least one target image frame, wherein the first image frame, the at least one target image frame, and the second image frame are sequentially captured by the monitoring equipment;

obtaining an end exposure time of a last row among a plurality of rows of the first image frame that are sequentially exposed by the shutter of the monitoring equipment;

obtaining a start exposure time of a first row among a plurality of rows of the second image frame that are sequentially exposed by the shutter of the monitoring equipment, wherein it is assumed that a start exposure time of the first image frame is 0, the end exposure time of the last row corresponding to the first image frame is $(1/\text{FPS})+ (n-1)*\Delta t$, and the start exposure time of the first row corresponding to the second image frame is $(3/\text{FPS})+ (2T_{buffer})-T$; and determining the initial time period based on a difference between the end exposure time of the last row of the first image frame and the start exposure time of the first row of the second image frame; and obtaining a warning scheme associated with the initial time period, wherein the warning scheme includes:

controlling an operation of a light associated with the monitoring equipment within at least one candidate time period in the initial time period by:

setting different flashing schemes of the light according to a switch status of the light by:

determining whether the light is turned on, wherein the light being turned on indicates that an environmental brightness is relatively low and the light is used for supplementary light, and the light being turned off indicates that the environmental brightness is relatively high and the light is not used for supplementary light;

if the light is turned off, controlling the light to turn on and off alternately within the at least one candidate time period so as to realize a flicker of the light; and if the light is turned on, increasing and decreasing a brightness of the light alternately within the at least one candidate time period so as to realize the flicker of the light under a premise of ensuring that the environmental brightness can meet monitoring requirements; and processing the at least one target image frame.

10. A non-transitory computer readable medium, comprising executable instructions that, when executed by at least one processor, direct the at least one processor to perform a method, the method comprising:

obtaining, based on at least one parameter of a monitoring equipment, an initial time period corresponding to at least part of a time period during which at least one target image frame is captured by the monitoring equipment, wherein the at least one parameter of the monitoring equipment includes frames per second (FPS), a count n of rows that are sequentially exposed by a shutter of the monitoring equipment, an exposure interval $\Delta t$ between two adjacent rows, a shutter time T, and a buffer time $T_{buffer}$ between two adjacent frames, and the initial time period is obtained by:

obtaining a first image frame and a second image frame associated with the at least one target image frame, wherein the first image frame, the at least one target image frame, and the second image frame are sequentially captured by the monitoring equipment;

obtaining an end exposure time of a last row among a plurality of rows of the first image frame that are sequentially exposed by the shutter of the monitoring equipment;

obtaining a start exposure time of a first row among a plurality of rows of the second image frame that are sequentially exposed by the shutter of the monitoring equipment, wherein it is assumed that a start exposure time of the first image frame is 0, the end exposure time of the last row corresponding to the first image frame is—(1/FPS)+ (n−1)*$\Delta t$, and the start exposure time of the first row corresponding to the second image frame is (3/FPS)+(2$T_{buffer}$)−T); and determining the initial time period based on a difference between the end exposure time of the last row of the first image frame and the start exposure time of the first row of the second image frame; and obtaining a warning scheme associated with the initial time period, wherein the warning scheme includes:

controlling an operation of a light associated with the monitoring equipment within at least one candidate time period in the initial time period by:

setting different flashing schemes of the light according to a switch status of the light by:

determining whether the light is turned on, wherein the light being turned on indicates that an environmental brightness is relatively low and the light is used for supplementary light, and the light being turned off indicates that the environmental brightness is relatively high and the light is not used for supplementary light;

if the light is turned off, controlling the light to turn on and off alternately within the at least one candidate time period so as to realize a flicker of the light; and if the light is turned on, increasing and decreasing a brightness of the light alternately within the at least one candidate time period so as to realize the flicker of the light under a premise of ensuring that the environmental brightness can meet monitoring requirements; and processing the at least one target image frame.

11. The method of claim 3, wherein controlling at least one of a flicker frequency or a brightness of the light based on the parameter of the light and the distance includes:

dividing the distance into a plurality of distance sections; and setting different flicker frequencies or different brightnesses of the light in different distance sections based on a flicker timing and an electrical level parameter of the light.

12. The method of claim 11, wherein the at least one target image frame is determined by:

determining a required time for the light to implement at least one flicker based on a parameter of the light, the parameter of the light including at least one of a type of the light, a status of the light, a flicker frequency of the light, a brightness of the light, or a high level duration and a low level duration of a flicker of the light; and determining a count of the at least one target image frame based on the required time for the light to implement the at least one flicker and an exposure time of each target image frame.

13. The method of claim 12, wherein the controlling an operation of a light associated with the monitoring equipment includes:

determining a required initial time period based on the required time for the light to implement the at least one flicker;

determining whether the initial time period is less than the required initial time period; and if the initial time period is less than the required initial time period, adjusting the at least one parameter of the monitoring equipment to adjust the initial time period to make the adjusted initial time period larger than or equal to the required initial time period; and controlling the operation of the light within at least one candidate time period in the adjusted initial time period.

14. The method of claim 13, wherein the processing the at least one target image frame includes:

processing the at least one target image frame by adjusting a brightness of the at least one target image frame.

15. The method of claim 12, wherein the at least one target image frame is determined by:

extracting even-numbered frames or odd-numbered frames from a plurality of image frames that are continuously captured by the monitoring equipment in sequence; and specifying each of the even-numbered frames or odd-numbered frames as the at least one target image frame.

\* \* \* \* \*